(12) United States Patent
Wang

(10) Patent No.: US 8,177,968 B2
(45) Date of Patent: May 15, 2012

(54) FILTER CUP ASSEMBLY

(76) Inventor: Te-Hsing Wang, Taichung (TW)

( * ) Notice: Subject to any disclaimer, the term of this patent is extended or adjusted under 35 U.S.C. 154(b) by 321 days.

(21) Appl. No.: 12/584,848

(22) Filed: Sep. 11, 2009

(65) Prior Publication Data

US 2011/0062153 A1 Mar. 17, 2011

(51) Int. Cl.
*B01D 35/26* (2006.01)
(52) U.S. Cl. ............... 210/136; 210/239; 210/416.3; 210/419; 210/482
(58) Field of Classification Search ............ 220/23.86; 210/136, 244, 245, 239, 240, 416.3, 261, 210/262, 464, 419, 482, 473, 474; 215/10
See application file for complete search history.

(56) References Cited

U.S. PATENT DOCUMENTS

| | | | | |
|---|---|---|---|---|
| 2,299,182 A * | 10/1942 | Schoof | ............................. | 220/8 |
| 2,435,627 A * | 2/1948 | Grandin et al. | ............... | 210/266 |
| 2,436,077 A * | 2/1948 | Robertson | ..................... | 210/317 |
| 3,752,604 A * | 8/1973 | Dorn | ............................. | 417/511 |
| 4,477,347 A * | 10/1984 | Sylva | ............................. | 210/232 |
| 5,308,482 A * | 5/1994 | Mead | ............................. | 210/207 |

* cited by examiner

*Primary Examiner* — Terry Cecil
(74) *Attorney, Agent, or Firm* — Charles E. Baxley

(57) ABSTRACT

A filter cup assembly includes a first cup having a one-way valve connected to a center of the underside of the first cup 10 and a filtering part is connected to the underside of the first cup. An adaptor is connected between the filtering part and a second cup. A presser includes a pressing plate connected with a rod, the pressing plate is inserted into the first cup to force contaminated water in the first cup to pass through the one-way valve, the filtering part and is collected in the second cup. All of the parts are threadedly connected to each other so that they can be separated individually. The first cup is sized to receive the second cup, the filtering part and the adaptor when not in use.

8 Claims, 7 Drawing Sheets

FILTER CUP ASSEMBLY

FIELD OF THE INVENTION

The present invention relates to a filter cup assembly, and more particularly, to a filter cup assembly which is easily to carry and use to filter fluid.

BACKGROUND OF THE INVENTION

Tap water is the most important source that people can have in modern cities and some people still concern that the tap water includes too much Chlorine and heavy metal substrate so that filtering devices are used widely. However, during outdoor activities, there will be no tap water available and people have to carry water they need. Water becomes a major burden for travelers because water is heavy and occupies a lot of space. How to get clean water is one of the key concerns for the travelers. Although filtering devices can solve the water problem, the conventional filtering devices are heavy and inconvenient for transportation and carry. Therefore, a compact and convenient filtering device is needed which is required to filter water obtained from rivers, creeks and rain drops.

The present invention intends to provide a filter cup assembly that is easily stored to be a cup-like unit and the filtering cup assembly can filter water into edible water.

SUMMARY OF THE INVENTION

The present invention relates to a filter cup assembly which comprises a first cup having a first locking portion at an underside thereof and a one-way valve is connected to a center of the underside of the first cup. A second locking portion is located at an open top of the first cup. A second cup has a third locking portion at an open top thereof and a lid has a fourth locking portion. A filtering part has filtering material received therein and a connection portion extends from a top thereof. A fifth locking portion is located at an underside of the filtering part. An adaptor has a sixth locking portion at a top thereof and a seventh locking portion is located at an underside thereof. The seventh locking portion is connected with the fifth locking portion. The adaptor is connected to the second cup by connecting the sixth locking portion to the third locking portion to connect the filtering part, the adaptor and the second cup. The one-way valve of the first cup is connected to the connection portion of the filtering part.

The primary object of the present invention is to provide a compact filter cup assembly which is easily stored and assembled, and is able to filter contaminated water into edible water.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
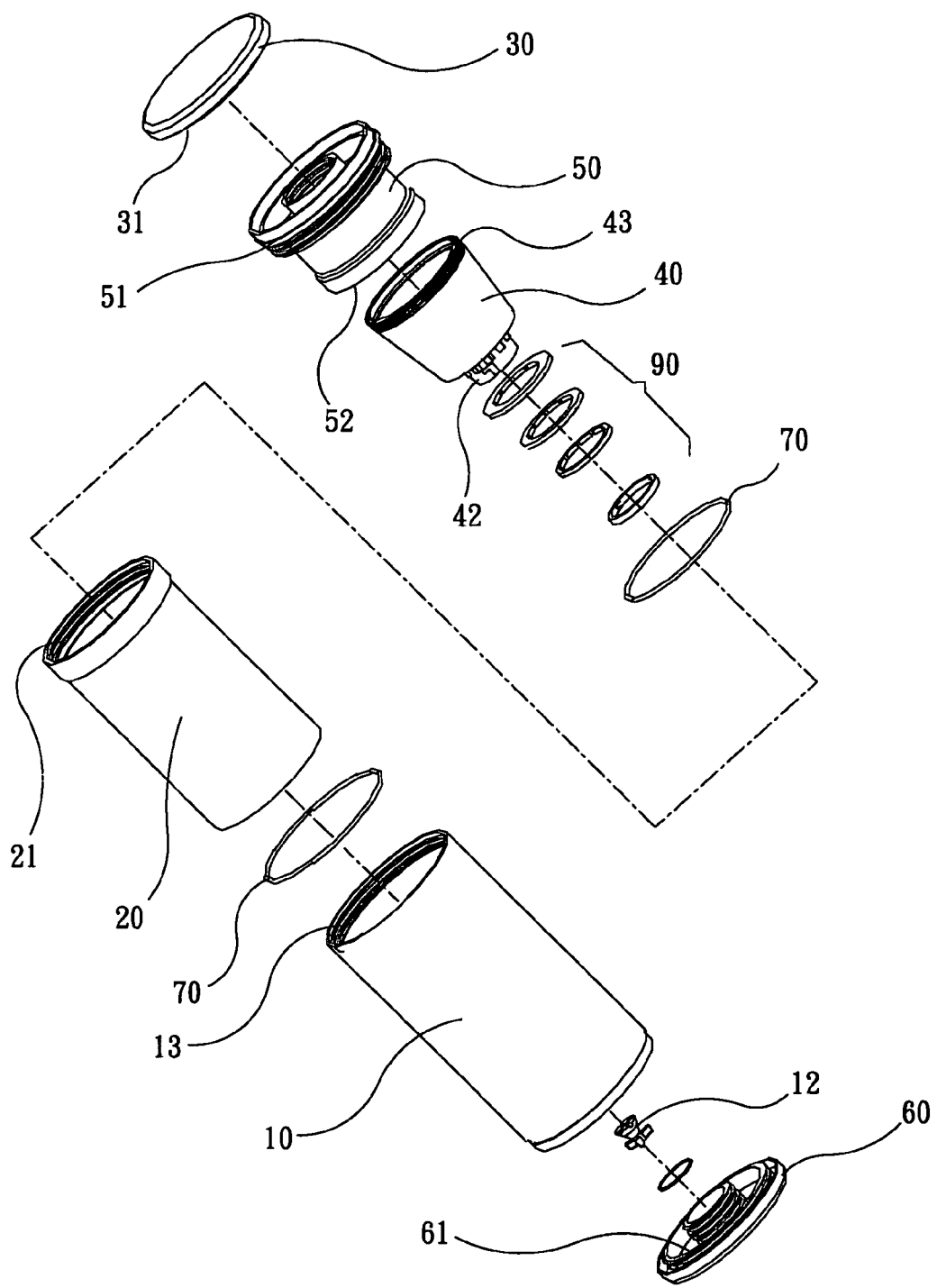
FIG. 1 is an exploded view to show the filter cup assembly of the present invention.

Referring to FIGS. 1 to 4, the filter cup assembly of the present invention comprises a first cup 10, a second cup 20, a lid 30, a filtering part 40 and an adaptor 50. The first cup 10 has a first locking portion 11 at an underside thereof and a one-way valve 12 is connected to a center of the underside of the first cup 10. A second locking portion 13 is located at an open top of the first cup 10. The second cup 20 has a third locking portion 21 at an open top thereof and the lid 30 has a fourth locking portion 31. The filtering part 40 has filtering material 41 received therein and a connection portion 42 extends from a top of the filtering part 40. A fifth locking portion 43 is located at an underside of the filtering part 40. The adaptor 50 has a sixth locking portion 51 at the lower end thereof and a seventh locking portion 52 is located at the top of the adaptor 50. The sixth locking portion 51 includes threads located at inside and outside of the adaptor 50. The seventh locking portion 52 is connected with the fifth locking portion 43.

Furthermore, a bottom plate 60 has an eighth locking portion 61 and is connected to the first locking portion 11 of the first cup 10 to protect the one-way valve 12. At least one seal ring 70 is mounted to the filtering part 40 to prevent from leakage from the filtering part 40. Multiple counter rings 90 can be mounted to the filtering part 40 so that the users are acknowledged when the filtering part 40 should be changed.

A presser 80 is used to force contaminated water to pass through the filtering part 40 via the open top of the first cup 10. The presser 80 includes a connection disk 81 and a rod 82 which extends through the connection disk 81 and is connected to a pressing plate 83. The connection disk 81 is connected to the second locking portion 13 of the first cup 10 and the pressing plate 83 is movably located in the first cup 10.

When in use, the adaptor 50 is connected to the second cup 20 by connecting the sixth locking portion 51 to the third locking portion 21 to connect the filtering part 40, the adaptor 50 and the second cup 20 which is located at the lowest position of the assembly. The one-way valve 12 of the first cup 10 is connected to the connection portion 42 of the filtering part 40. The presser 80 is inserted into the first cup 10 with the connection disk 81 connected with the second locking portion 13. The user pushes the rod 82 to let the pressing plate 83 to push the contaminated water in the first cup 10 through the filtering part 40 and the filtered water is then collected in the second cup 20.

Figures 6, 7:
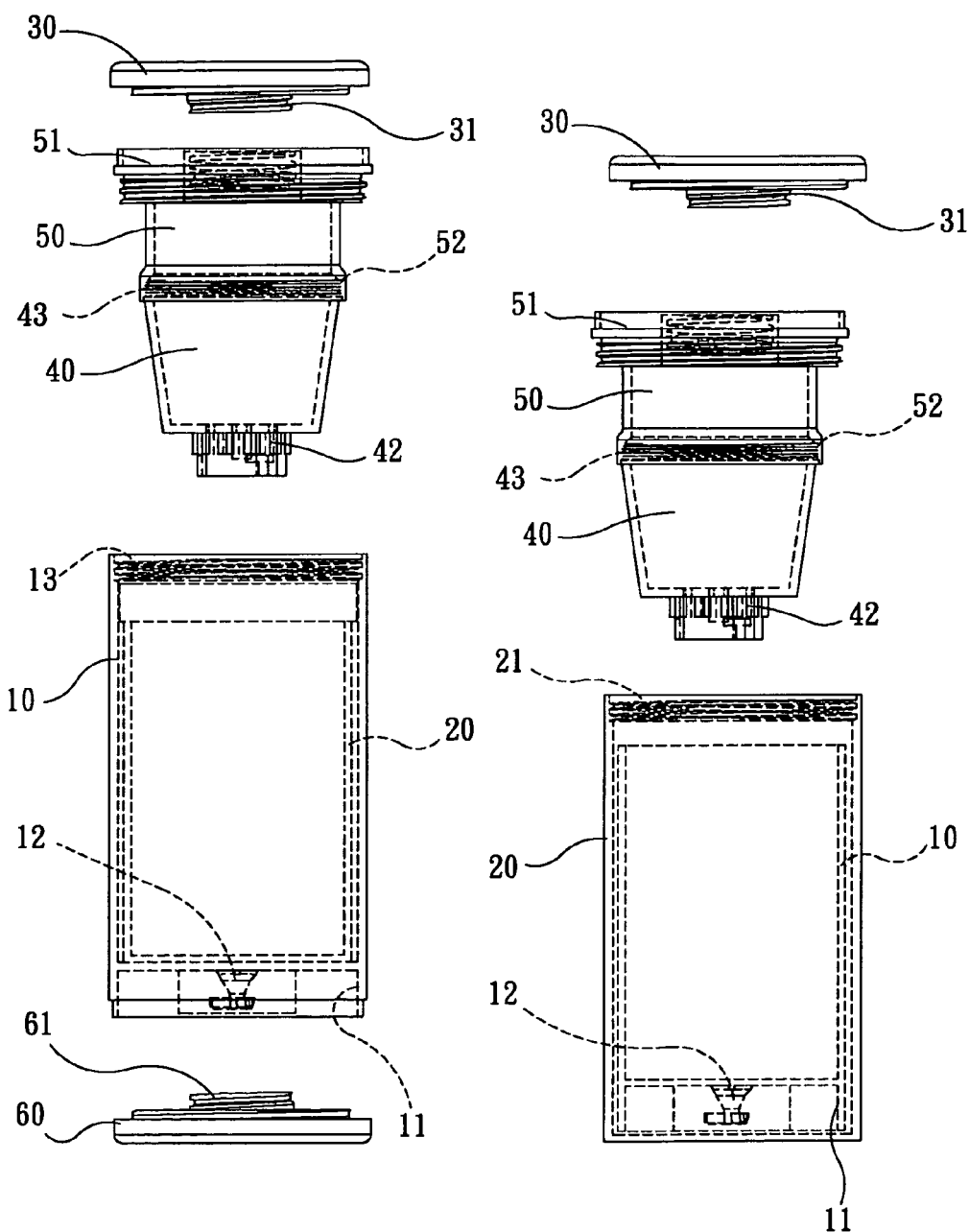
FIG. 6 shows that the filter cup assembly of the present invention is to be stored wherein the second cup is received in the first cup.
FIG. 7 shows the other embodiment that the filter cup assembly of the present invention is to be stored wherein the second cup is received in the first cup.

As shown in FIG. 6, when the filter cup assembly is not in use, in this embodiment, the first cup 10 is larger than the second cup 20 which is sized to be received in the first cup 10 via the open top of the first cup 10. The seventh locking portion 52 is connected to the fifth locking portion 43 to connect the adaptor 50 and the filtering part 40. The filtering part 40 is then received in the second cup 20. The sixth locking portion 51 of the adaptor 50 is connected to the second locking portion 13 of the first cup 10. Then the fourth locking portion 31 of the lid 30 is connected to the sixth locking portion 51 of the adaptor 50 to complete the storage status of the filter cup assembly.

Figure 8:
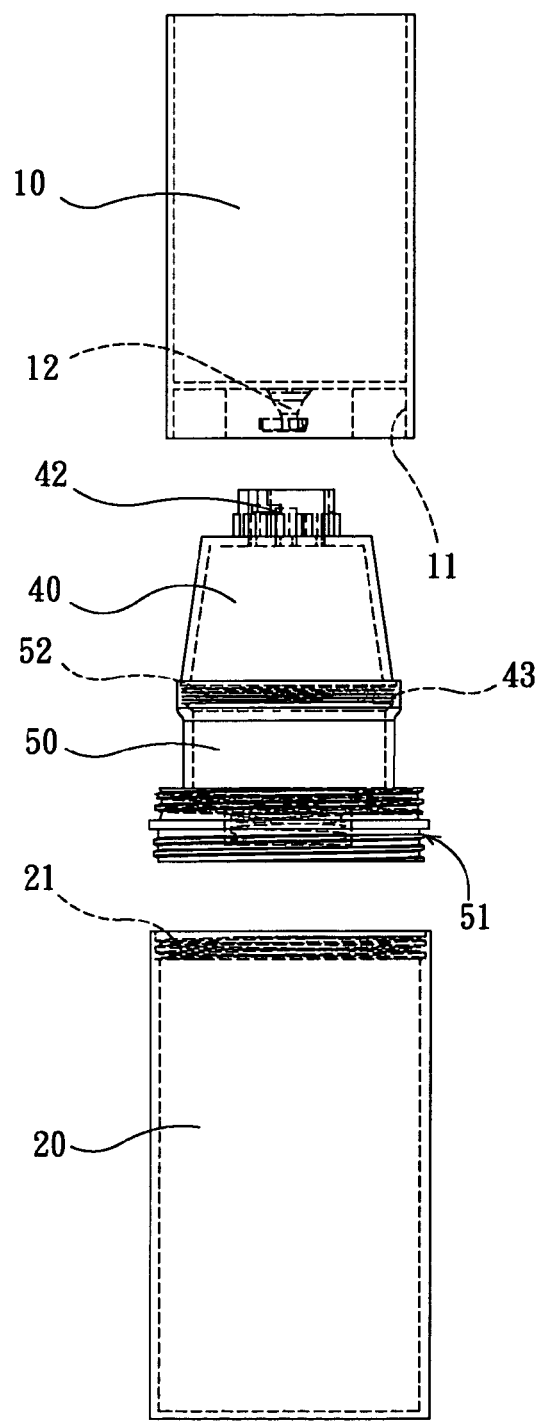
FIG. 8 shows that the filter cup assembly of the present invention is to be assembled wherein the second cup is sized larger than the first cup.
Figure 9:
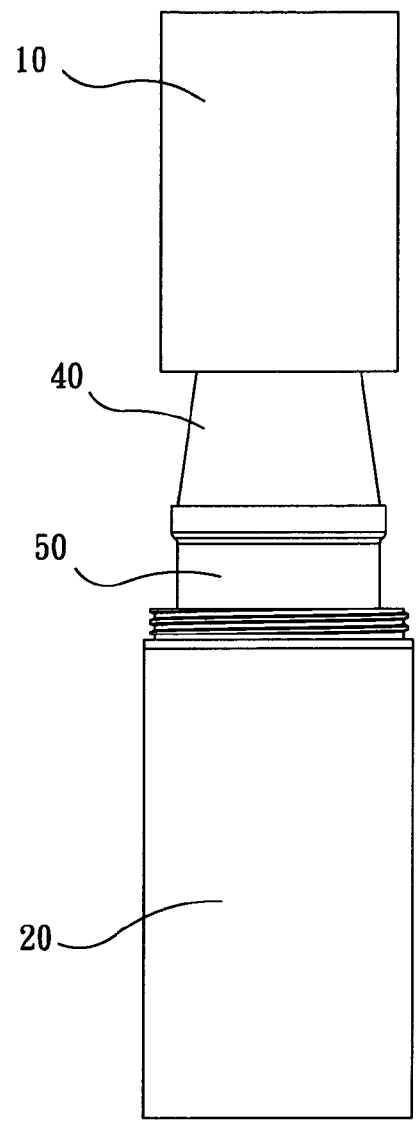
FIG. 9 shows the plan view to show that the filter cup assembly of the present invention is assembled wherein the second cup is received in the first cup.

As shown in FIGS. 7 to 9 which show another embodiment of the filter cup assembly wherein the first cup 10 is smaller than the second cup 20 which is sized to accommodate the first cup 10 therein via the open top of the second cup 20. The sixth locking portion 51 of the adaptor 50 is connected to the third locking portion 21 of the second cup 20 so that the filtering part 40 is received in the first cup 10. The fourth locking portion 31 of the lid 30 is connected to the sixth locking portion 51 of the adaptor 50 to complete the storage status of the filter cup assembly.

When in use, the embodiment shown in FIGS. 7 to 9 set the second cup 20 at the lowest position and the third locking portion 21 of the second cup 20 is connected to the sixth locking portion 51 of the adaptor 50. The sixth locking portion 51 includes threads on outside of the adaptor 50 so that the filter part 40, the adaptor 50 and the second cup 20 can be connected together. The one-way valve 12 on the underside of the first cup 10 is connected to the connection portion 42 of the filtering part 40 to connect the first cup 10 and the filtering part 40. The first cup 10 is smaller than the second cup 20 so that the whole assembly does not tend to fall on the ground.

It is noted that the second cup 20 can be replaced by a bottle which is sized to be connected to the sixth locking portion 51 by setting the sixth locking portion 51 to be suitable for being connected with a bottle which is used as the second cup 20.

Figure 2:
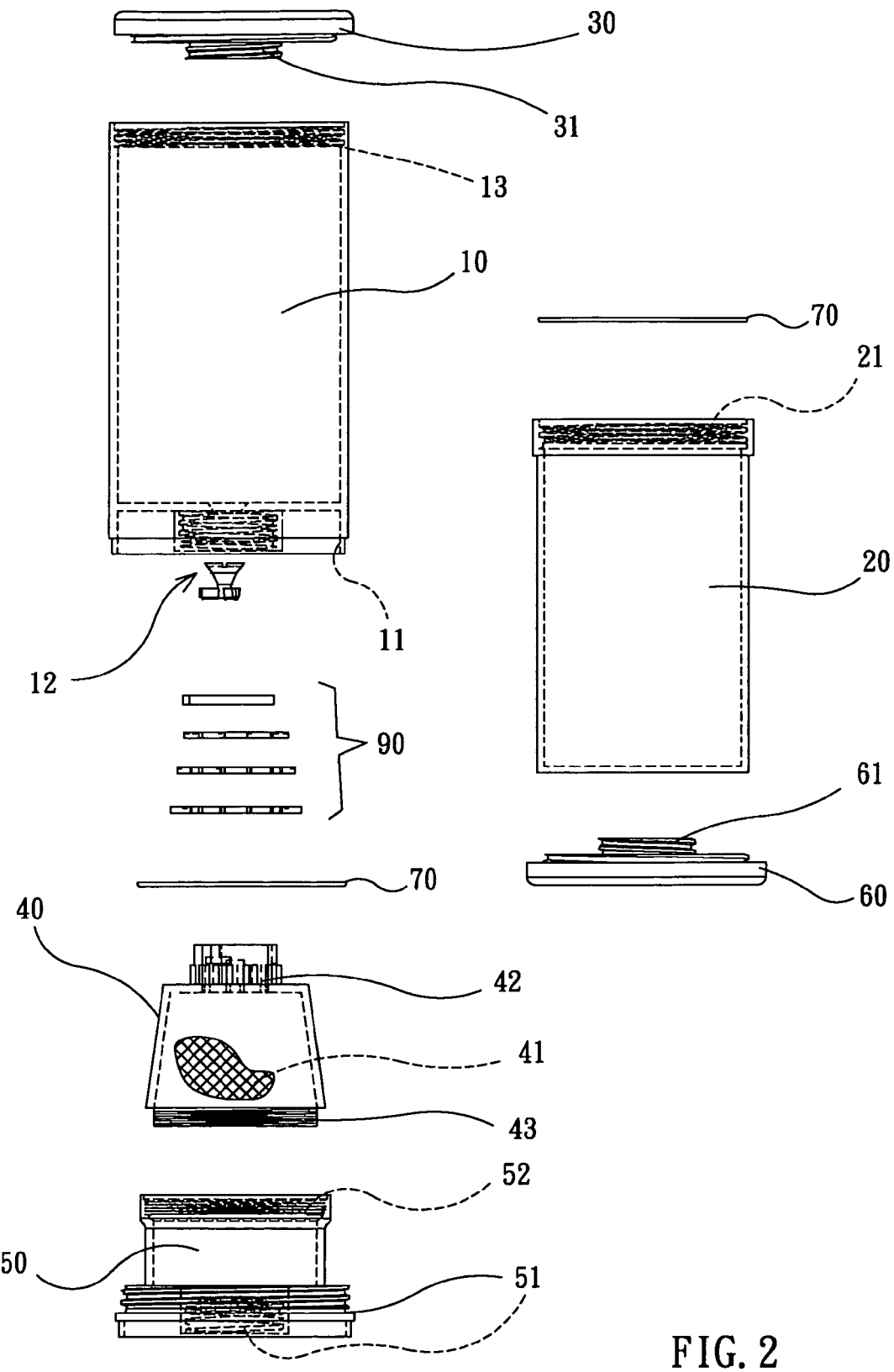
FIG. 2 shows the plan view of the parts of the filter cup assembly of the present invention.
Figures 3, 4:
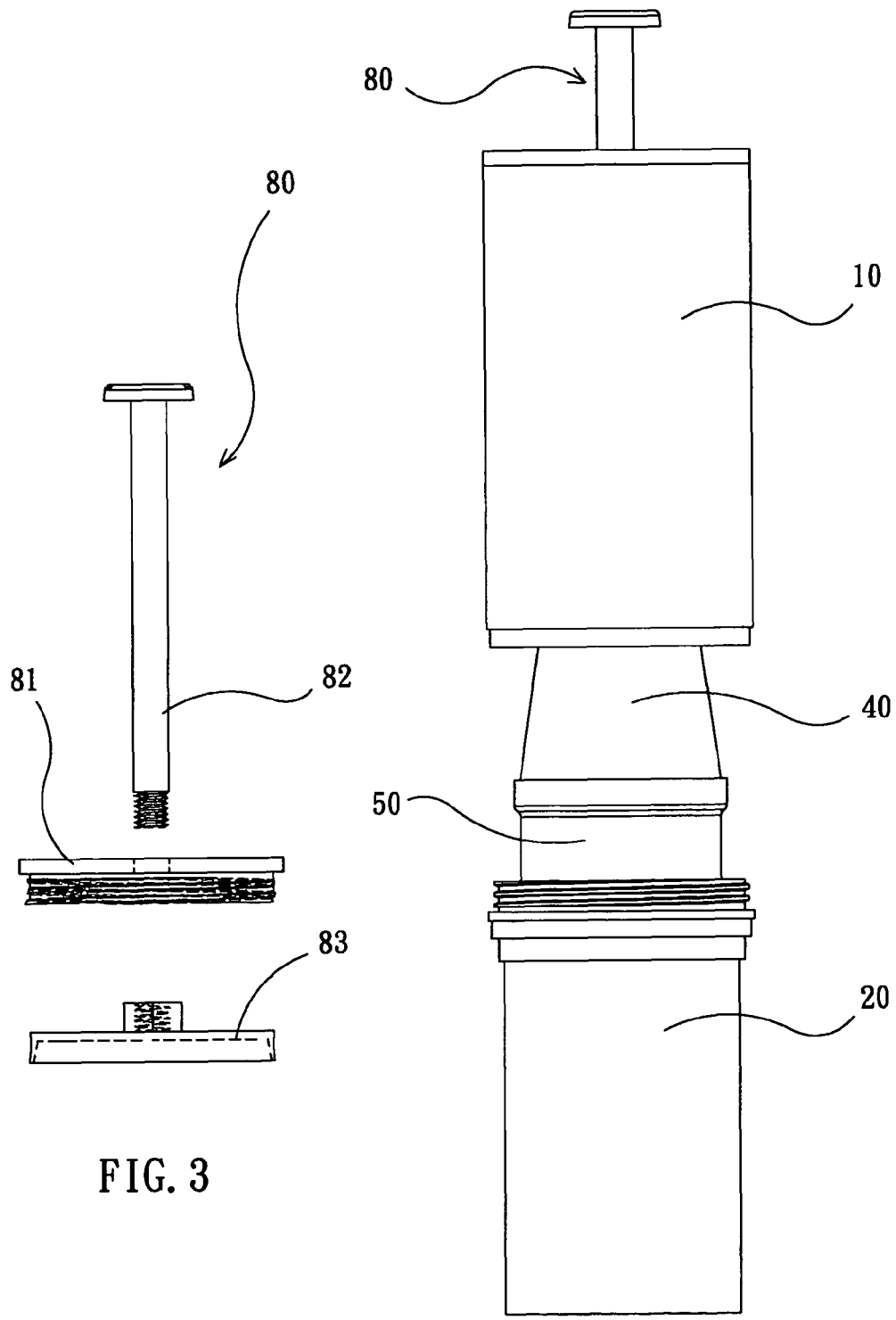
FIG. 3 shows the presser of the filter cup assembly of the present invention.
FIG. 4 shows the connection of the filter cup assembly of the present invention.
Figure 5:
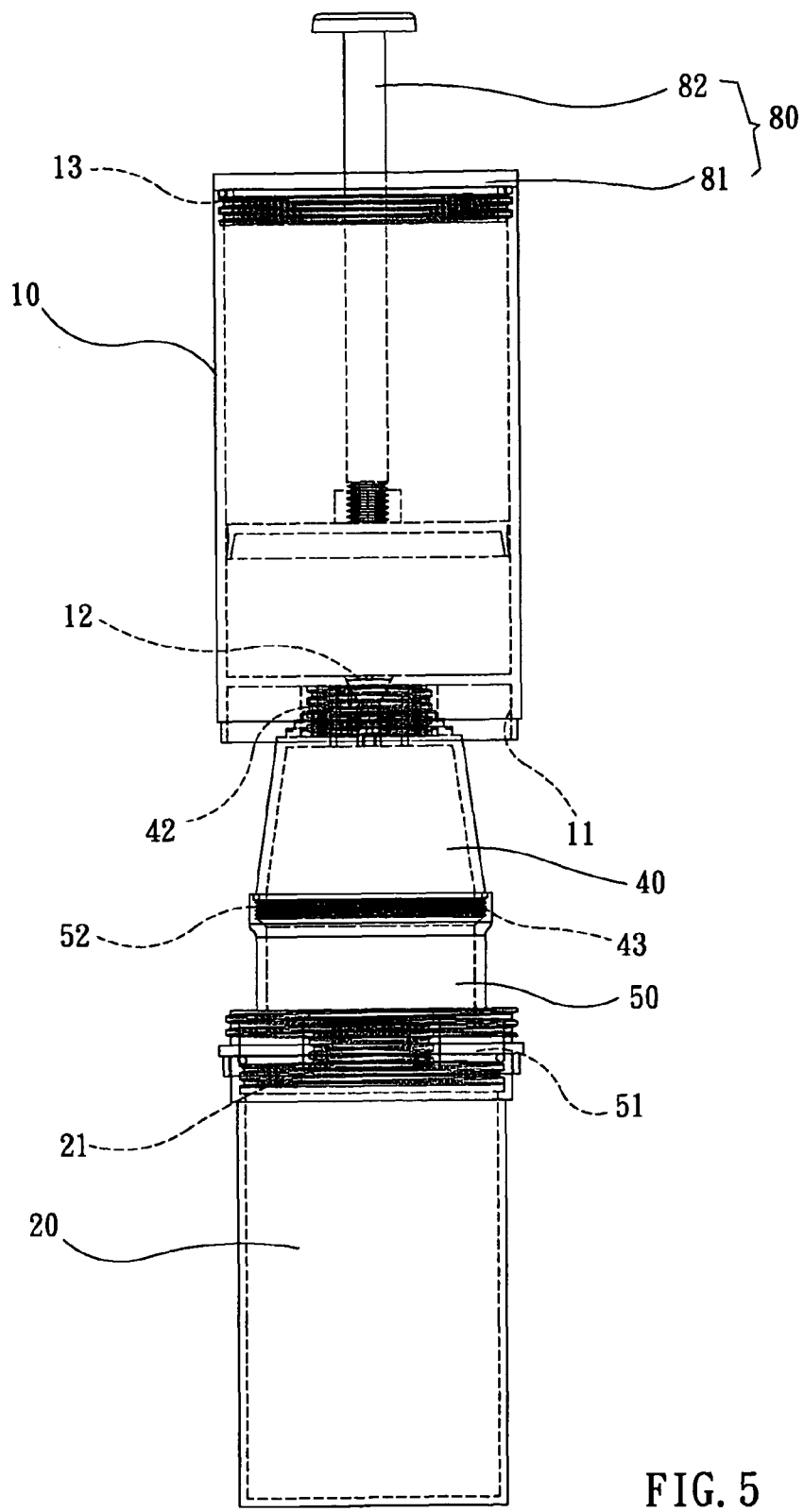
FIG. 5 shows the connection between the parts of the filter cup assembly of the present invention.

The adaptor 50 includes four connection ways, the first is disclosed in FIG. 6 wherein the sixth locking portion 51 is connected to the second locking portion 13 by its lower portion; the second way is disclosed in FIG. 5 wherein the adaptor 50 is mounted (not threaded) to the outside of the second cup 20; the third way is disclosed in FIG. 2 wherein the sixth locking portion 51 located in the adaptor 50 is mounted (not threaded) to the outside of the connection portion 42, and the fourth way is disclosed in FIG. 8 wherein the adaptor 50 is connected to the third locking portion 21 of the second cup 20 by its lower portion.

Figure 11:
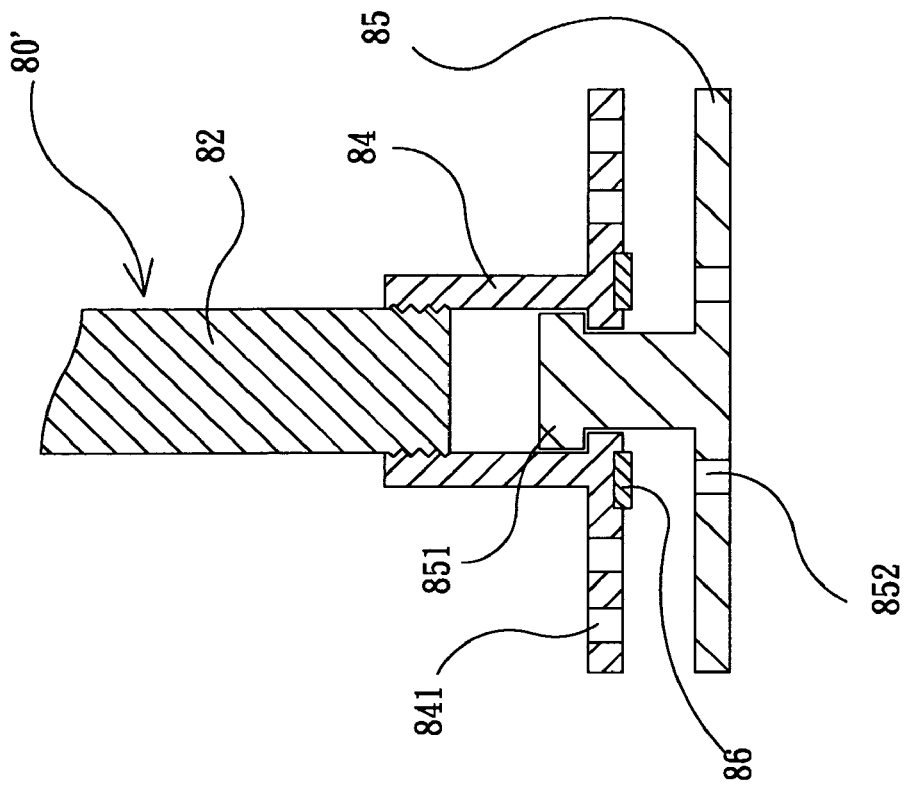
FIG. 11 is a cross sectional view of the presser disclosed in FIG. 10.
Figure 10:
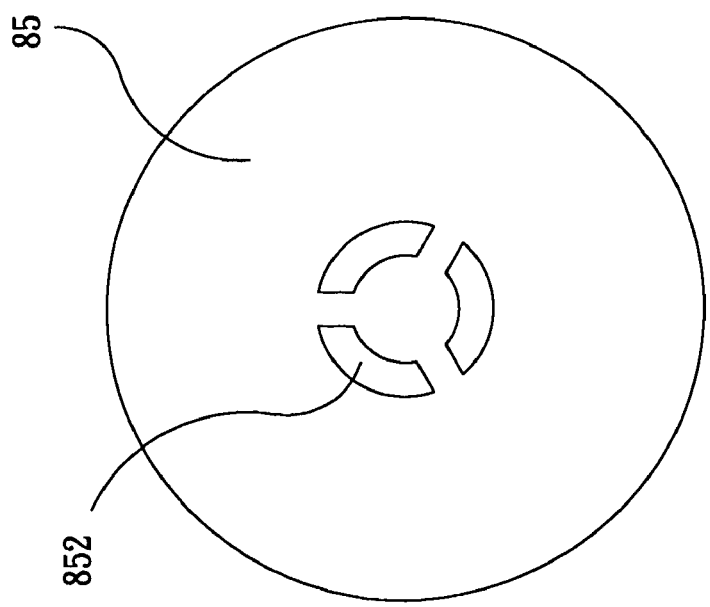
FIG. 10 shows an bottom view of another embodiment of the presser.

FIGS. 10 and 11 show another embodiment of the presser 80' which comprises a rod 82 which is threadedly connected with a tubular portion of an upper pressing plate 84 and a bottom pressing plate 85 which is connected to the underside of the upper pressing plate 84. The bottom pressing plate 85 includes a protrusion 851 which is axially and movably located in the tubular portion of the upper pressing plate 84 from an underside of the tubular portion. The protrusion 851 includes a flange which restricts the protrusion 851 from being disengaged from the tubular portion. A seal ring 86 is connected to the underside of the upper pressing plate 84. The upper pressing plate 84 includes first through holes 841 defined therethrough and the bottom pressing plate 85 includes second through holes 852 defined therethrough. The second through holes 852 are located corresponding to the seal ring 86 on the underside of the upper pressing plate 84. When the user pushes the rod 82, the water resistance forces the protrusion to be axially moved upward in the tubular portion of the upper pressing plate 84, the bottom pressing plate 85 contacts against the underside of the upper pressing plate 84 and the seal ring 86 seals the second through holes 852 to force the water to be pushed downward. When the rod 82 is pulled upward, the bottom pressing plate 85 is disengaged from the upper pressing plate 84 so that the water flows through the gap between the first cup 10 (not shown in FIGS. 10 and 11), the upper pressing plate 84, the bottom pressing plate 85, and is accumulated above the upper pressing plate 84. The water accumulated above the upper pressing plate 84 then flows through the first and second through holes 841, 852 and enters the space beneath the bottom pressing plate 85. Therefore, by reciprocally operating the rod 82, the water can be filtered.

While we have shown and described the embodiment in accordance with the present invention, it should be clear to those skilled in the art that further embodiments may be made without departing from the scope of the present invention.

What is claimed is:

1. A filter cup assembly comprising:
a first cup having a first locking portion at an underside thereof and a one-way valve connected to a center of the underside of the first cup, a second locking portion located at an open top of the first cup;
a second cup having a third locking portion at an open top thereof;
a lid having a fourth locking portion;
a filtering part having filtering material received therein and a connection portion extending from a top thereof, a fifth locking portion located at an underside of the filtering part;
an adaptor having a sixth locking portion at a lower end thereof and a seventh locking portion located at a top thereof, the seventh locking portion connected with the fifth locking portion;
the adaptor connected to the second cup by connecting the sixth locking portion to the third locking portion to connect the filtering part, the adaptor and the second cup, the one-way valve of the first cup connected to the connection portion of the filtering part, and
a presser connected with the first cup via the open top of the first cup and comprising a rod, an upper pressing plate and a bottom pressing plate, the rod threadedly connected with a tubular portion of the upper pressing plate, the bottom pressing plate having a protrusion which is axially and movably located in the tubular portion of the upper pressing plate from an underside of the tubular portion, a seal ring connected to an underside of the upper pressing plate, the protrusion including a flange which restricts the protrusion from being disengaged from the tubular portion, the upper pressing plate having first through holes defined therethrough and the bottom pressing plate having second through holes defined therethrough, the second through holes located corresponding to the seal ring on the underside of the upper pressing plate, a gap defined between the first cup, the upper pressing plate, the bottom pressing plate.

2. The assembly as claimed in claim 1, wherein the first cup is larger than the second cup which is sized to be received in the first cup via the open top of the first cup, the sixth locking portion of the adaptor is connectable to the second locking portion of the first cup so that the filtering part is received in the second cup, the fourth locking portion of the lid is connected to the sixth locking portion of the adaptor to complete the storage status of the filter cup assembly.

3. The assembly as claimed in claim 2 further comprising a bottom plate which has an eighth locking portion which is connectable to the first locking portion of the first cup to protect the one-way valve.

4. The assembly as claimed in claim 1, wherein the first cup is smaller than the second cup which is sized to accommodate the first cup therein via the open top of the second cup, the sixth locking portion of the adaptor is connectable to the third locking portion of the second cup so that the filtering part is received in the first cup, the fourth locking portion of the lid is connectable to the sixth locking portion of the adaptor to complete the storage status of the filter cup assembly.

5. The assembly as claimed in claim 1, wherein at least one seal ring is mounted to the filtering part.

6. The assembly as claimed in claim 1, wherein the sixth locking portion includes threads located at inside of the adaptor.

7. The assembly as claimed in claim 1, wherein the sixth locking portion includes threads located at outside of the adaptor.

8. The assembly as claimed in claim 1, wherein the sixth locking portion includes threads located at inside and outside of the adaptor.

* * * * *